US009596268B2

United States Patent
Narayanaswamy et al.

(10) Patent No.: US 9,596,268 B2
(45) Date of Patent: *Mar. 14, 2017

(54) SECURITY ENFORCEMENT IN VIRTUALIZED SYSTEMS

(71) Applicant: Juniper Networks, Inc., Sunnyvale, CA (US)

(72) Inventors: Krishna Narayanaswamy, Saratoga, CA (US); Roger A. Chickering, Granite Bay, CA (US); Steven A. Malmskog, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/620,901

(22) Filed: Feb. 12, 2015

(65) Prior Publication Data

US 2015/0156219 A1 Jun. 4, 2015

Related U.S. Application Data

(63) Continuation of application No. 13/051,471, filed on Mar. 18, 2011, now Pat. No. 8,959,569.

(51) Int. Cl.
*H04L 29/06* (2006.01)
*G06F 9/50* (2006.01)
(Continued)

(52) U.S. Cl.
CPC .......... *H04L 63/20* (2013.01); *G06F 9/45558* (2013.01); *G06F 9/5077* (2013.01); *G06F 21/53* (2013.01); *G06F 21/604* (2013.01); *H04L 63/10* (2013.01); *H04L 63/1416* (2013.01); *H04L 63/1433* (2013.01);
(Continued)

(58) Field of Classification Search
CPC ........... G06F 2009/45587; G06F 21/53; G06F 2221/2141; G06F 2221/2149; G06F 9/45558; G06F 9/5077; H04L 63/1416; H04L 63/10; H04L 63/20
See application file for complete search history.

(56) References Cited

U.S. PATENT DOCUMENTS 5,761,477 A * 6/1998 Wahbe ................ G06F 11/3624
714/E11.211
7,249,187 B2 * 7/2007 Sobel ..................... H04L 63/20
709/227

(Continued)

OTHER PUBLICATIONS

Kuhlmann et al., "An Open Trusted Computing Architecture—Secure Virtual Machines Enabling User-Defined Enforcement", Retrieved from http://maswi.polito.it/doc/public/rz3655.pdf, Published Jun. 28, 2006.*

*Primary Examiner* — Chau Le
(74) *Attorney, Agent, or Firm* — Harrity & Harrity, LLP

(57) ABSTRACT

A system includes a virtual machine (VM) server and a policy engine server. The VM server includes two or more guest operating systems and an agent. The agent is configured to collect information from the two or more guest operating systems. The policy engine server is configured to: receive the information from the agent; generate access control information for a first guest OS, of the two or more guest operating systems, based on the information; and configure an enforcer based on the access control information.

20 Claims, 6 Drawing Sheets

(51) Int. Cl.
*G06F 21/53* (2013.01)
*G06F 21/60* (2013.01)
*G06F 9/455* (2006.01)

(52) U.S. Cl.
CPC ........... *G06F 2009/45587* (2013.01); *G06F 2221/2141* (2013.01); *G06F 2221/2149* (2013.01)

(56) References Cited

U.S. PATENT DOCUMENTS

| | | | |
|---|---|---|---|
| 7,409,719 | B2 | 8/2008 | Armstrong et al. |
| 7,603,719 | B2* | 10/2009 | Thomas .................. G06F 21/62 709/223 |
| 7,725,559 | B2 | 5/2010 | Landis et al. |
| 7,801,964 | B2 | 9/2010 | Kohavi |
| 7,818,803 | B2 | 10/2010 | Gordon |
| 7,870,153 | B2 | 1/2011 | Croft et al. |
| 8,281,363 | B1* | 10/2012 | Hernacki .......... H04L 29/08846 709/225 |
| 8,959,569 | B2 | 2/2015 | Narayanaswamy et al. |
| 2008/0134176 | A1* | 6/2008 | Fitzgerald ............ G06F 9/45537 718/1 |
| 2008/0301759 | A1 | 12/2008 | Rivers et al. |
| 2009/0216975 | A1* | 8/2009 | Halperin ............. G06F 9/45537 711/162 |
| 2009/0241192 | A1 | 9/2009 | Thomas |
| 2010/0017512 | A1 | 1/2010 | Ciano et al. |
| 2010/0251363 | A1 | 9/2010 | Todorovic |

* cited by examiner

SECURITY ENFORCEMENT IN VIRTUALIZED SYSTEMS

RELATED APPLICATION

This application is a continuation of U.S. patent application Ser. No. 13/051,471, filed Mar. 18, 2011 (now U.S. Pat. No. 8,959,569), which is incorporated herein by reference.

BACKGROUND

Security concerns have increased enforcement measures that are taken before allowing a client (e.g., a computer of a user) to access a resource (e.g., ability to download/upload data, ability to access a private network) provided by a destination server. Often, an enforcement device, situated in a network between the client and the destination server, requires an administrator or a user of the client to install an agent on the client to gather information about the client and to push the information from the client to a policy engine server. The policy engine server determines whether to allow the client to access the resource of the destination server based on the gathered information and communicates that determination to the enforcement device. One problem with this approach is that a user of the client is currently able to turn off the locally-installed agent and attempt to bypass security measures. Another problem is that compatibility issues (e.g., driver conflicts) may arise between the agent and other software applications that the user wants to execute on the client. As a result, the agent might hinder the user's ability to perform actions other than accessing the destination server. Also, an agent for a destination might not run on a particular client whose hardware and/or software configurations are not compatible with the agent.

Another growing trend is the virtualization of Central Processing Units (CPUs) to run independent virtual systems. Virtualized CPUs may implement multiple "virtual machines." A virtual machine (VM) server may execute the multiple VMs simultaneously. A virtual machine (VM) may execute an individual guest operating system (OS) for a client that uses the VM. Currently, in order to allow clients to access a resource of a destination server via guest OSs of a VM, a separate agent needs to run on each one of the guest OSs. Accordingly, similar issues that arise with running an agent on each individual client may arise when running the agent on each one of the guest OSs corresponding to the clients.

Additionally, an administrator of a VM needs to manually pre-install and configure an agent, needed to access a resource of a destination server, for each guest image on the VM. Policy server engines may periodically update what actions their corresponding agents need to perform to provide access. As a result, further administrative overhead is consumed when an administrator needs to determine whether the agents are up to date and manually reconfigure/update the multiple agents of the VM after each one of the updates. Also, a user may manually create a fresh VM and fail to install an agent on the VM. The fresh VM, without the agent, would not be able to facilitate access to a destination server associated with the agent.

SUMMARY

According to one aspect, a method may include: receiving, by a computer device, an instance request from a client device; executing, by the computer device, in response to the instance request, a first guest operating system (OS) of a virtual machine (VM) server; probing, by an agent of the computer device, the first guest OS for first information and one or more other guest operating systems of the VM server for other information; determining, by the computer device, whether first criteria are met based on the first information; and allowing, by the computer device, the first guest OS to access a resource of a destination server when the first criteria are met.

According to another aspect, a non-transitory computer-readable medium may store a program for causing a computer to perform a method. The method may include: receiving guest information, for a guest operating system (OS) of a first virtual machine (VM) server; receiving application information, for an instance of a second VM server, from a second agent of the second VM server; determining a type of access to allow the guest OS, to the instance of the second VM server, based on the guest information and the application information; generating access control information based on the determined type of access; and providing the access control information to an enforcer. The first agent may collect the guest information from the guest OS and other guest information from one or more other guest operating systems of the first VM server.

According to yet another aspect, a system may include a virtual machine (VM) server and a policy engine server. The VM server may include two or more guest operating systems and an agent. The agent may collect information from the two or more guest operating systems. The policy engine server may: receive the information from the agent; generate access control information for a first guest OS, of the two or more guest operating systems, based on the information; and configure an enforcer based on the access control information. The access control information may indicate whether to allow the first guest OS access to a destination. The enforcer may allow or deny the first guest OS access to the destination.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
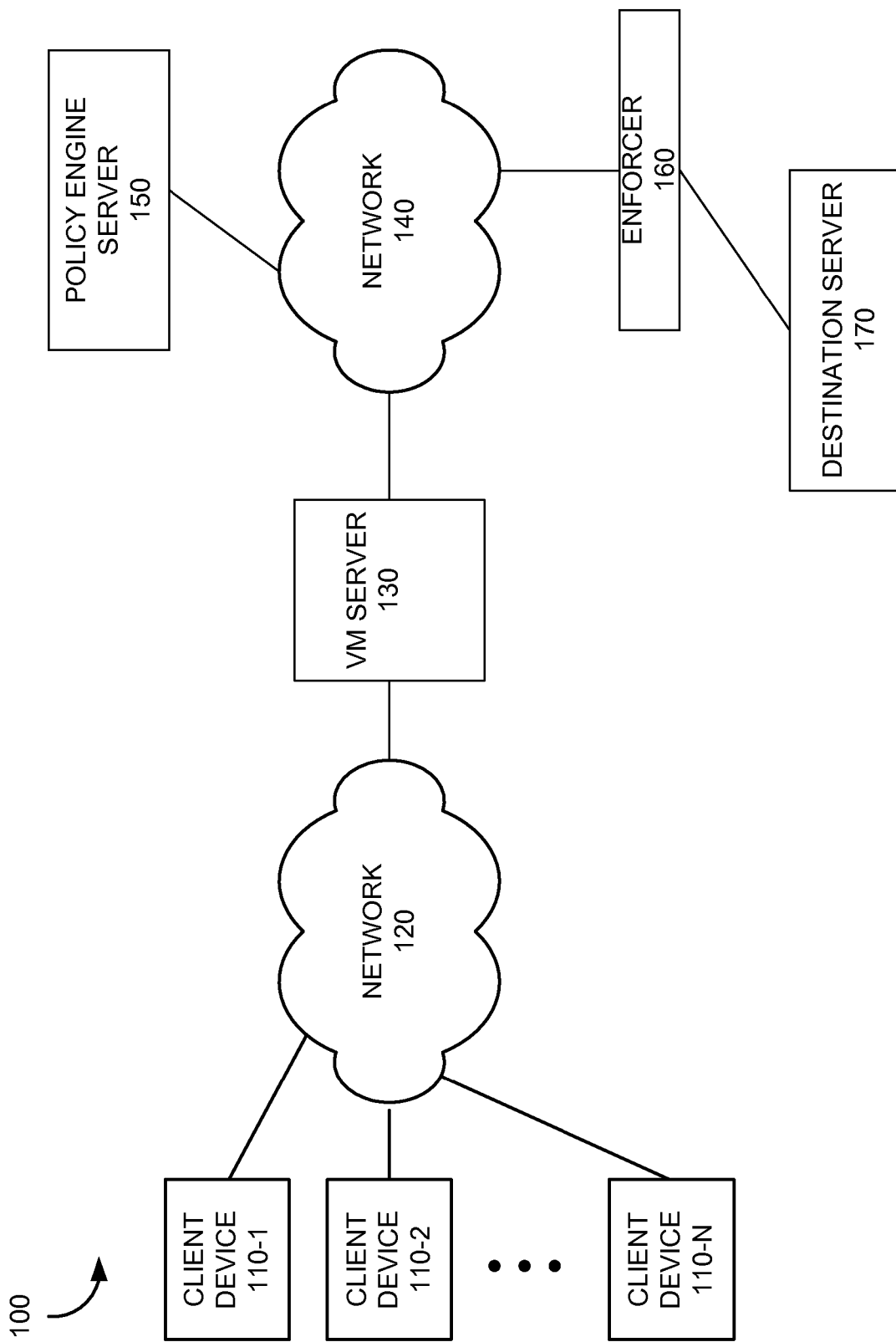
FIG. 1 is a diagram of an example environment in which systems and/or methods described herein may be implemented.

The following detailed description refers to the accompanying drawings. The same reference numbers in different drawings may identify the same or similar elements.

A virtual machine (VM) may include a software implementation of a machine that executes programs like a physical machine. The VM may include two different types of virtual machines: a system virtual machine that provides a system platform that supports the execution of a complete operating system; and a process virtual machine that is designed to run a single program. A software layer providing virtualization of a VM is called a hypervisor. A VM server may include a single hypervisor. All the VMs (and the guest OSs) of the VM server may use the services of the hypervisor. The hypervisor, also called a virtual machine monitor (VMM), can run on hardware or on top of an operating system of the VM server. The hypervisor may control the instantiation of the VM. The hypervisor may allow multiple guest operating systems (OSs), operating as instances of the VM, to run concurrently on the VM server. Each one of the guest OSs may correspond to a different client that requests an instance of the VM from the VM server.

An implementation, described herein, may provide security enforcement for virtualized systems. A client, of a group of clients, may connect to a VM server. The VM server may allocate an instance of a VM to the client. The VM may execute a guest operating system (OS), for the client. The VM server may transmit data to a client to display a representation of the guest OS (e.g., to display the representation via Remote Desktop (RDT)) of the VM. The VM server may execute a single agent, in the hypervisor, for all of the guest OSs in the VM server. The agent may determine when a new VM/guest OS is added by the hypervisor. The agent may probe the guest OS, while probing one or more other guest OSs, for guest information about the guest OS. The guest information may include health information (e.g., patch level of the guest OS, whether the guest OS has a firewall enabled, whether the guest OS has a latest version of a particular anti-virus software installed, etc.), current activity information (e.g., current network connections of the guest OS), identity information (e.g., an identifier (e.g., name) of the user who is operating the client, and identifier of a device implementing the client), information about application(s) that are running on the guest OS, etc.

The agent may transmit the guest information to a firewall agent or a policy engine. In one implementation, the firewall agent may, based on the guest information, determine whether to allow the guest OS to access one or more resources of a destination server. Herein, accessing a resource of a destination server may refer to accessing an independent network via the destination server or accessing an application or a web service hosted by the destination server. In another implementation, the policy engine may determine whether to allow the guest OS to access one or more resources of the destination server by evaluating the guest information. The policy engine may conduct the evaluation by running the guest information through (security) policies associated with accessing the destination server (e.g., determine whether an identifier of the user matches an identifier of a person who or a device that is allowed access to the destination server, as required by one of the policies). The policy engine may generate access control information based on the evaluation of the guest information. The policy engine may configure an enforcer with the access control information. The enforcer may allow or deny, based on the access control information, the guest OS access to one or more of the resources of the destination server.

FIG. 1 is a diagram of an example environment 100 in which systems and/or methods described herein may be implemented. Environment 100 may include one or more of the following elements: client devices 110-1, 110-2, . . . , 110-N(N≥1) (collectively referred to as "client devices 110" and individually as "client device 110"), a network 120, a VM server 130, a network 140, a policy engine server 150, an enforcer 160, and a destination server 170. In practice, environment 100 may include additional elements, fewer elements, different elements, or differently arranged elements than are shown in FIG. 1. Also, one or more elements of environment 100 may perform the tasks described as being performed by one or more other elements of environment 100.

Client device 110 may represent any device capable of receiving data from and/or transmitting data to network 120. Client device 110 may allow a user to prompt client device 110 to receive/transmit the data. In one implementation, client device 110 may take the form of a computer, a server, a smart phone, a personal computer, a laptop, a handheld computer, a portable communication device (e.g., a mobile phone), an access point base station, etc. Client device 110 may connect to network 120 directly or indirectly through, for example, a router, a switch, a bridge, a firewall, a gateway, a base station, etc. Client device 110 may transmit a request, via network 120, to VM server 130 for an instance of a VM. Client device 110 may receive data, via network 120, from VM server 130 to display a representation of a guest OS for the instance of the VM or a user interface for the web application.

Network 120 and network 140 may include a single network, multiple networks of a same type, or multiple networks of different types. For example, each one of network 120 and/or network 140 may include a direct connection between devices, a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

VM server 130 may represent any device capable of implementing VM(s). In one implementation, VM server 130 may take a form of one or more of a computer, a server, multiple servers, etc. VM server 130 may execute one or more different VMs. VM server 130 may receive requests, via network 120, from client devices 110 for a particular VM. VM server 130 may execute a separate guest OS, for the particular VM, in response to each one of the requests. VM server 130 may execute a single agent, on a hypervisor of the VM, to probe information from each one of the guest OSs. In another implementation, VM server 130 may represent a cluster. A single agent may be executed on each node of the cluster. VM server 130 may transmit data to or receive data from policy engine server 150, enforcer 160, and/or destination server 170, directly or via network 140.

Policy engine server 150 may represent any device capable of determining whether to allow a guest OS of VM server 130 to access destination server 170. Policy engine server 150 may take a form of one or more of a hardware/software component, a computer, a server, multiple servers, a router, a switch, a firewall, a gateway, etc. Policy engine server 150 may receive, from VM server 130 (directly or via network 140), guest information about guest OSs of VM server 130. Policy engine server 150 may generate and transmit, to enforcer 160 (directly or via network 140), access control information. In another implementation, one of VM server 130, enforcer 160, or destination server 170 may include policy engine server 150.

Enforcer 160 may represent any device capable of enforcing (providing or denying) access by a guest OS of VM server 130 to destination server 170 and/or resource(s) of destination server 170. Enforcer 160 may take a form of a network element, a router, a switch, a firewall, a gateway, a hardware/software component, a computer, a server, multiple servers, etc. Enforcer 160 may receive, from a guest OS of VM server 130, traffic directed towards (or a request to access) destination server 170. Enforcer 160 may receive, directly or via network 140, access control information, for the guest OS, from policy engine server 150. Enforcer 160 may allow the guest OS to access one or more resources of destination server 170 based on the access control information. In another implementation, one of VM server 130, network 140, policy engine server 150, or destination server 170 may include enforcer 160.

Destination server 170 may represent any device capable of receiving and/or transmitting data. Destination server 170 may provide one or more resources that a guest OS of VM server 130 may request to access. Destination server 170 may take a form of any computer, including a server (e.g., web server, file server, etc.). In another implementation, destination server 170 may act as an access point to (or be a part of) a separate network (not shown in FIG. 1) that provides one or more resources. Destination server 170 may receive permission from enforcer 160, directly or via network 140, before allowing the guest OS to utilize resources associated with destination server 170.

In another implementation, destination server 170 may also act as a VM server. Destination server 170 may run a plurality of VMs to provide web services and/or applications (e.g, PeopleSoft applications, web service, email service, etc.). Destination server 170 may also, like VM server 130, include a hypervisor with a single agent for a VM. Destination server 170 may create/execute a guest OS for each instance of a web service/an application. The single agent may gather application information about the web service/the application of a particular guest OS. The single agent of destination server 170 may transmit, directly or via network 140, the application information to a firewall agent of VM server 130 or to policy engine server 150. The firewall agent of VM server 130 or policy engine server 150 may use the application information, in addition to the guest information, to determine what type of access (if any) to provide a guest OS of VM server 130 to destination server 170.

In yet another implementation, a single VM server may include both VM server 130, which hosts guest OSs for users of clients 110, and a separate VM (e.g., of destination server 170 or of separate application VMs of VM server 130), which provides the applications/services that the users are accessing. For example, VM server 130 may include client VMs for the guest OSs and the application VMs. The single VM server (e.g., VM server 130) may also include enforcer 160 and/or another enforce to enforce (provide or deny) access by a client VM to the application VMs.

Figure 2:
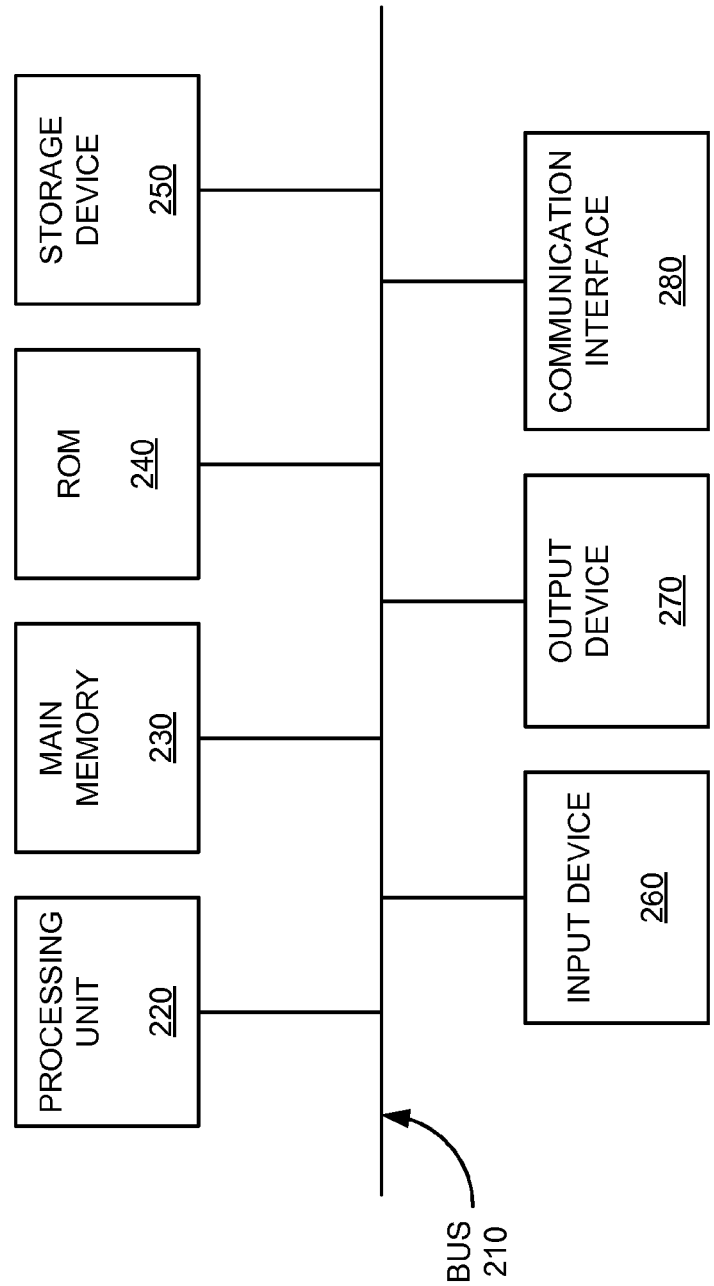
FIG. 2 is a diagram of example components of one or more of the devices of FIG. 1.

FIG. 2 is a diagram of example components of a device 200 that may correspond to one or more of client device 110, VM server 130, policy engine server 150, enforcer 160, or destination server 170. Each one of client device 110, VM server 130, policy engine server 150, enforcer 160, and destination server 170 may include one or more devices 200 and/or one or more of any of the components of device 200.

As shown in FIG. 2, device 200 may include a bus 210, a processing unit 220, a main memory 230, a read only memory (ROM) 240, a storage device 250, an input device 260, an output device 270, and a communication interface 280. Bus 210 may include a path that permits communication among the components of device 200. Bus 210 may represent one or more dedicated buses that connect different components of device 200. For example, one of the dedicate busses may directly connect processing unit 220 to main memory 230 and/or ROM 240.

Processing unit 220 may include one or more processors, microprocessors, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive, or a form of removable memory, such as a flash memory.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As will be described in detail below, device 200 may perform certain operations. Device 200 may perform these operations in response to processing unit 220 executing software instructions (e.g., computer program(s)) contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more other tasks described as being performed by one or more other components of device 200.

Figure 3:
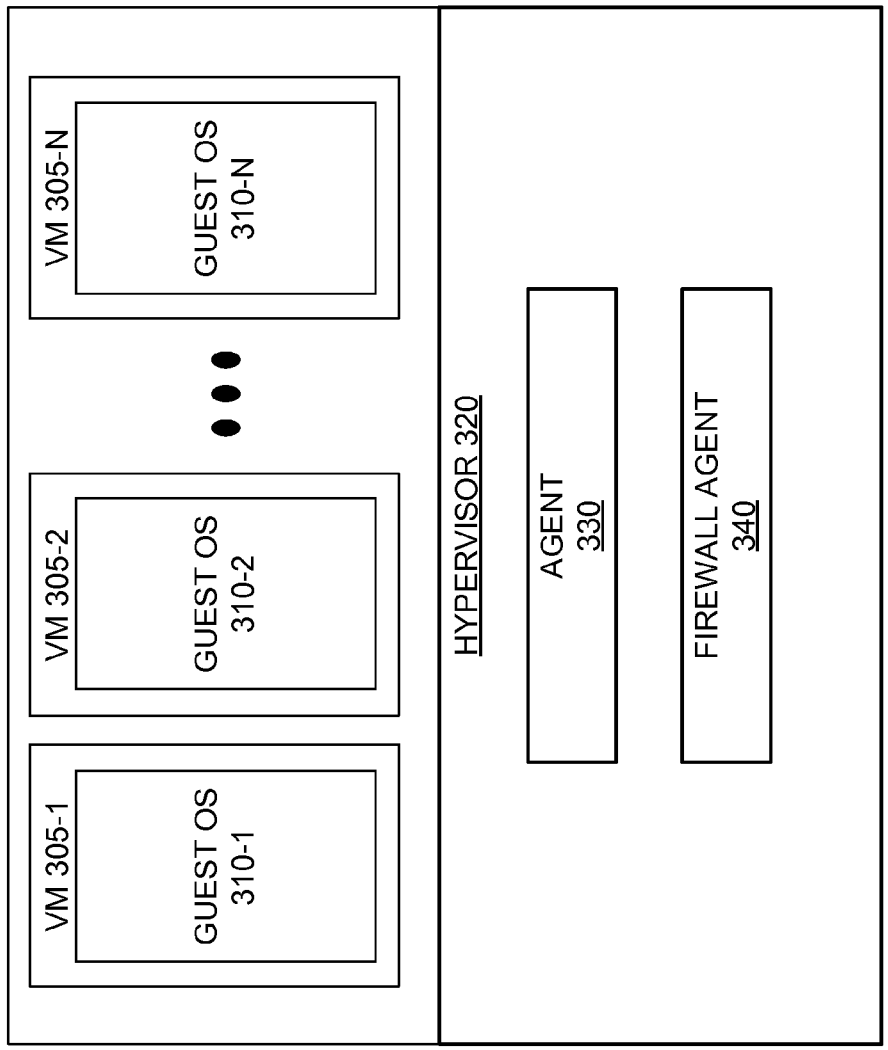
FIG. 3 is a diagram conceptually illustrating example components of a virtual machine (VM) server.

FIG. 3 is a diagram conceptually illustrating example components of a virtual machine (VM) server 130. As shown in FIG. 3, VM server 130 may include one or more of the following components: VMs 305-1, 305-2, . . . , 305-N (collectively referred to as "VMs 130" and individually as "VM 130") and a hypervisor 320. Each one of VMs 305 may run a single one of guest operating systems (OSs) 310-1, 310-2, . . . , 310-N (collectively referred to as "guest OSs 310" and individually as "guest OS 310"), respectively. In practice, VM server 130 may include additional components, fewer components, different components, or differently arranged components than are shown in FIG. 3.

As described above, hypervisor 320 may act as a software layer that allows a virtualization of VMs 305. In one implementation, hypervisor 320 may include an agent 330 and a firewall agent 340. In another implementation, as described below in reference to FIG. 4, hypervisor 320 may not include firewall agent 340. Agent 330 and firewall agent 340 may run inside hypervisor 320. Hypervisor 320 may manage agent 330, and/or firewall agent 340. Guest OSs 310 may use services of hypervisor 320. Hypervisor 320 may implement a control application through which guest OSs 310 may execute at VM server 130. Hypervisor 320 may receive a request for an instance of VM 305 from client device 110. The request may include identity information about a user of client device 110. Hypervisor 320 may take an image for a type of guest OS of VM 305 and instantiate a clone of the image to create VM 305 and to execute guest OS 310 on VM 305 for client device 110. Each one of guest OSs 310 may correspond to a different one of client devices 110.

Agent 330 may run in hypervisor 320. In one implementation, agent 330 may act as the sole agent, for accessing destination server 170, for all guest OSs 310. Agent 330 may determine that guest OS 310 has been added by hypervisor 330 and probe guest OS 310. In response to probing guest OS 310, agent 330 may receive health information about guest OS 310 and determine identity information of a user (or of client device 110) associated with guest OS 310. Agent 330 may retrieve the actual identity information from hypervisor 320, which received the request associated with guest OS 310. Agent 330 may transmit the health information and the identity information to firewall agent 340. In one implementation, agent 330 may periodically check (re-probe) whether information needs to be updated for guest OS. In another implementation, hypervisor 320 may notify agent 330 when a particular change-of-interest occurs (e.g., antivirus software is deleted) in guest OS 310. Agent 330 may re-probe guest OS 310 in response to the notification.

Firewall agent 340 may also run in hypervisor 320. Firewall agent 340 may determine what type of access (if any) to grant guest OS 310 based on the health information and the identity information received for guest OS 310 from agent 330. Firewall agent 340 may provide security enforcement of network traffic based on the determination. In other words, firewall agent 340 may allow or deny a user access, from guest OS 310, to a resource of destination server 170. For example, firewall agent 340 may allow a user who is in the legal department to access legal files that are stored on destination server 170 when the health information satisfies particular criteria (e.g., a particular version of anti-virus software is installed and/or a particular firewall is enabled) for accessing the legal files.

In another implementation, agent 330 may transmit health information and identity information, for guest OS 310, to policy engine server 150, which is outside hypervisor 320. Policy engine server 150 may determine directives regarding what type of access to grant guest OS 310 based on the health information and the identity information and policies retrieved by policy engine server 150. Policy engine server 150 may transmit the directives to firewall agent 340, which is inside hypervisor 320. Firewall agent 340 may allow or deny a user access, from guest OS 310, to a resource of destination server 170 based on the directives. Firewall agent 340 may not have access to the policies.

Figure 4:
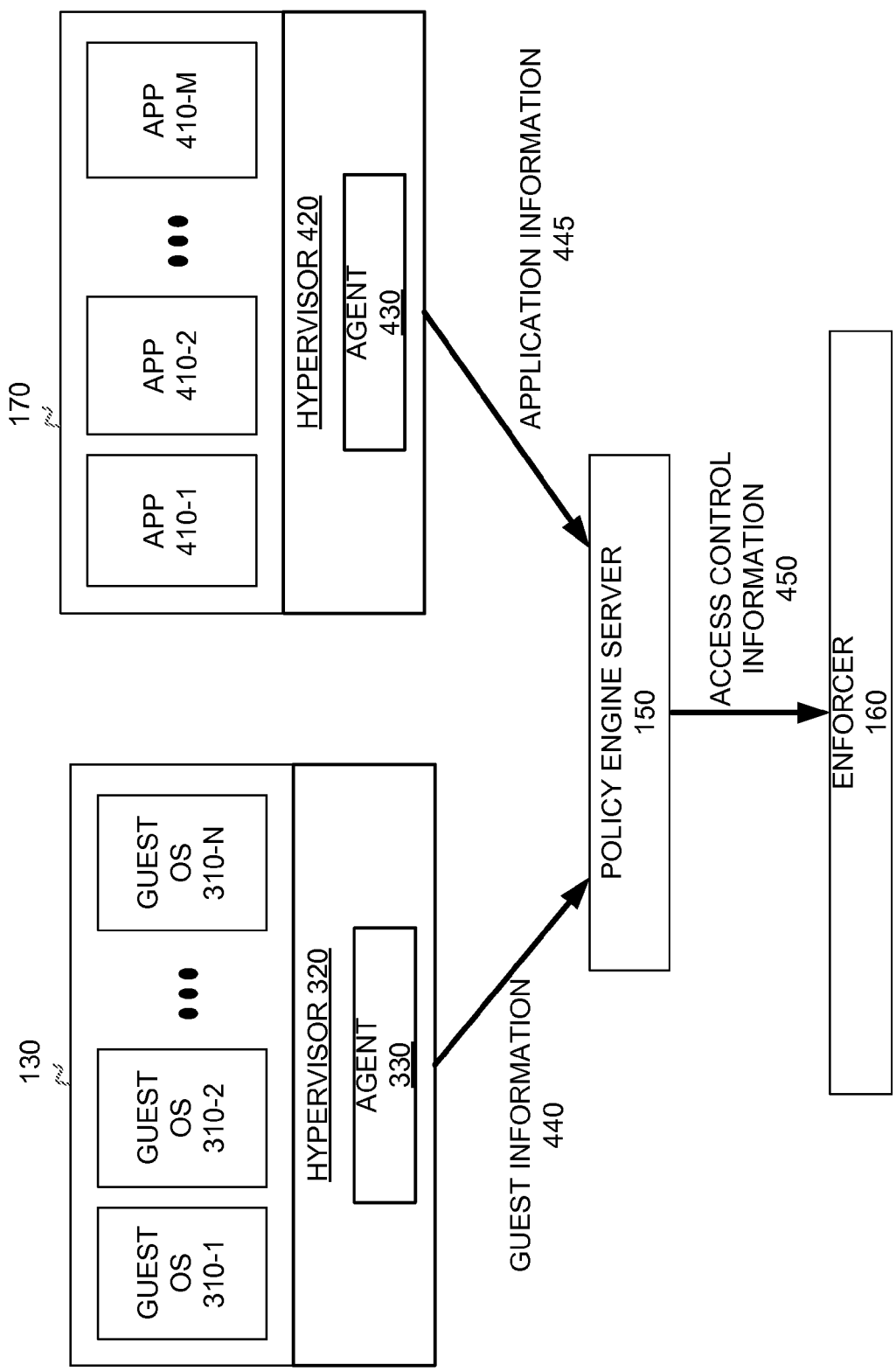
FIG. 4 is a diagram conceptually illustrating an example operation of servers of FIG. 1.

FIG. 4 is a diagram conceptually illustrating example components of VM server 130 and destination server 170, and an example operation of VM server 130, policy engine server 150, enforcer 160, and destination server 170. As shown in FIG. 4, VM server 130 may include one or more guest OSs 310, as described above in reference to FIG. 3 (VMs 305 are not shown in FIG. 4, but each one of guest OSs 310 corresponds to a different one VMs 305). Hypervisor 320 of VM server 130 may not include firewall agent 340, as shown in FIG. 3.

In one implementation, agent 330 may probe guest OSs 310 for health information and identity information. After receiving the health information and the identity information, agent 330 may transmit the health information and the identity information as guest information 440 to policy engine server 150. Policy engine server 150 may determine what type of access to allow guest OS 310 to resources of destination server 170 based on guest information 440.

Figure 5:
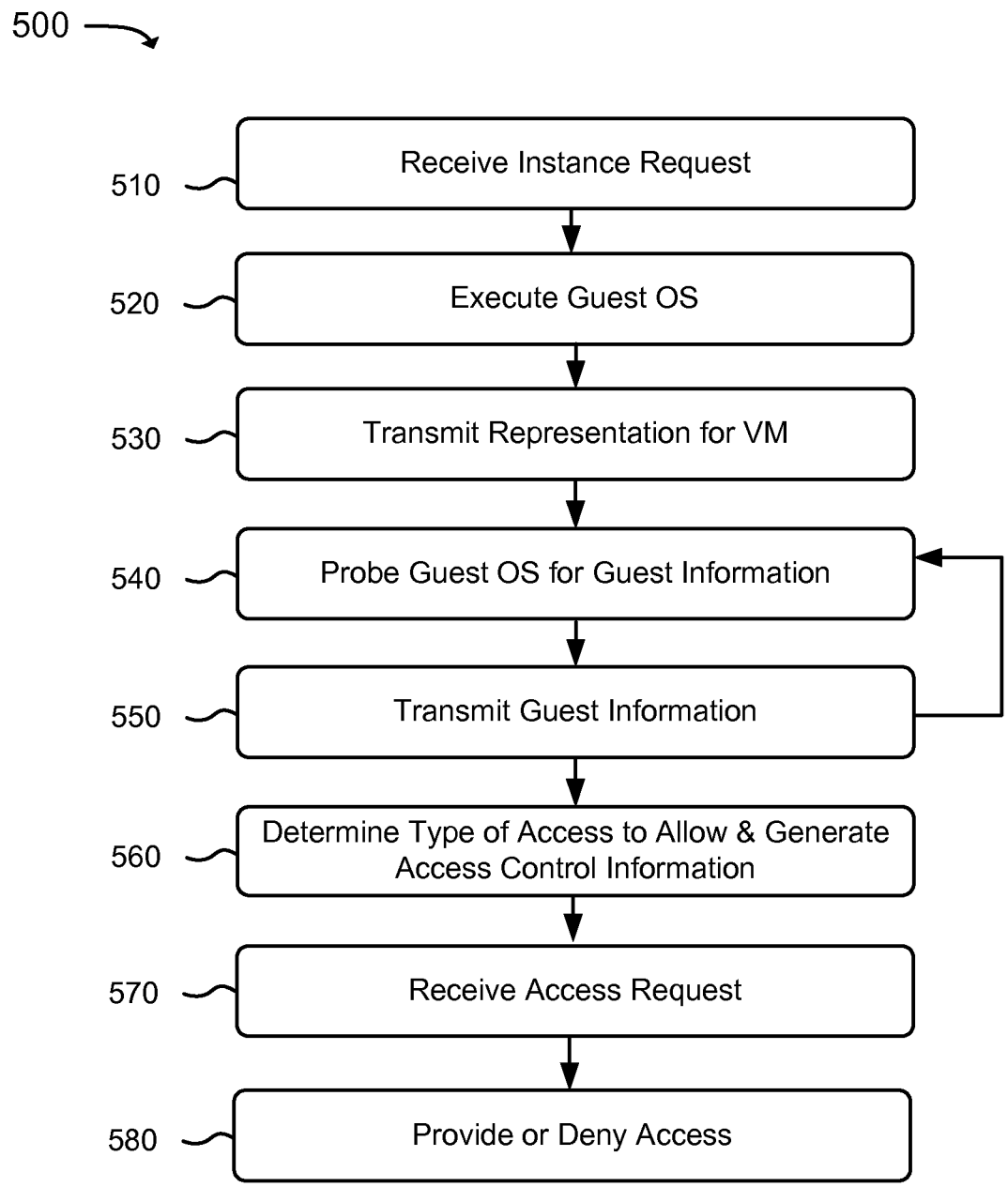
FIG. 5 is a flowchart of an example process for providing security for accessing a destination server via a VM.

In another implementation, as shown in FIG. 4, destination server 170 may be a VM server. As shown in FIG. 5, destination server 170 may include one or more instances of application VMs (herein, "apps") 410-1, 410-2, . . . , 410-M (M≥1) (collectively referred to as "apps 410" and individually as "app 410") and a hypervisor 420. In practice, destination server 170 may include additional components, fewer components, different components, or differently arranged components than are shown in FIG. 4.

App 410 may represent a VM running a guest OS for executing an application, as described further below. Hypervisor 420 may include an agent 430. Apps 410, hypervisor 420, and agent 430 may operate similarly to guest OSs 310, hypervisor 320, and agent 330, respectively, as described above.

In one implementation, agent 430 may act as the sole agent for all apps 410 of destination server 170. App 410 may provide particular application(s) or web service(s). Agent 430 may probe apps 410 for information about each one of apps 410. Agent 430 may transmit the information as application information 445 to policy engine server 150. Policy engine server 150 may determine what type of access to allow guest OS 310 to resources of destination server 170 (e.g., to use app 410) based on both guest information 440 and application information 445.

Policy engine server 150 may make determinations about what type of access to allow guest OS 310 based on a series of policies/criteria set by an administrator and provided to policy engine server 150. Policy engine server 150 may generate access control information 450 based on the determinations. Policy engine server 150 may transmit access control information 450 to enforcer 160 (or, in another implementation, policy engine server 150 may configure enforcer 160 based on access control information 450). A user may use guest OS 310 to access a resource (e.g., access to a network or use of an app 410) of destination server 170. Enforcer 160 may determine whether to allow or deny the user to access, from guest OS 310, the resource based on access control information 450.

FIG. 5 is a flowchart of an example process 500 for providing security enforcement for accessing destination server 170 via VM server 130. In one implementation, VM server 130 may perform process 500. In another implementation, some or all of process 500 may be performed by a device separate from or in combination with VM server 130.

As shown in FIG. 5, process 500 may include receiving an instance request (block 510). For example, a user of client device 110 may connect client device 110 to network 120. The user may use client device 110 to connect, via network 120, to VM server 130. The user may prompt client device 110 to generate the instance request to access an instance of VM 305 on VM server 130. Client device 110 may transmit the instance request to VM server 130. VM server 130 may receive the instance request. In one implementation, VM server 130 may require the user to log-in. VM server 130 may receive/determine the user's identity information during the log-in process. Agent 330 may retrieve the identity information at a later point in time, as described further below.

A guest OS 310 may be executed (block 520). For example, in response to the instance request, VM server 130 (e.g., particularly, hypervisor 320) may allocate an instance of VM 305 to the user of client device 110. VM server 130 may take an image for a type of guest OS 310 to execute in VM 305. VM server 130 may instantiate a clone of the image to create guest OS 310, which is associated with client device 110. VM server 130 may execute guest OS 310 for client device 110.

A representation for VM 305 may be transmitted (block 530). For example, client device 110 may provide, to the user of client device 110, a user interface (e.g., Remote Desktop (RDT)) to another computer/virtual system (e.g., a VM). VM server 130 may generate data to provide a representation, to display in the user interface, for guest OS 310, which is executing on VM server 130 in an instance of VM 305. VM server 130 may transmit the data for the representation to client device 110. The user interface of client device 110 may display the representation for guest OS 310 to the user. The representation may allow the user to use the user interface to interact with/control guest OS 310 (e.g., prompt guest OS 310 to (attempt to) access destination server 170).

Guest OS 310 may be probed for guest information (block 540). For example, hypervisor 320 of VM server 130 may include only a single agent, agent 330, for gathering all of the information needed for guest OSs 310 to access destination server 170. Agent 330 may determine that guest OS 310 is created/activated (i.e., added to VM server 130). After determining that guest OS 310 is created, agent 330 may probe guest OS 310 for health information, current activity information, and/or identity information. The health information may include statuses of various factors related to guest OS 310, including, for example, type and version of anti-virus software installed on guest OS 310, security settings of guest OS 310, patch levels of guest OS 310, etc. Probing for the health information may include scanning storage (e.g., physical memory (e.g., RAM), non-volatile storage (e.g., disk), etc.) associated with guest OS 310, conducting virus scan(s) on guest OS 310, testing a firewall associated with guest OS 310, etc. The current activity information may include dynamic information, including current network connections of guest OS 310 (e.g., whether guest OS 310 is connected to an external email service, etc.).

The identity information may include an identifier of the user of client 110, which is associated with guest OS 310. The identity information may include, for example, the name of the user, a numerical identifier corresponding to the user, information related to what type of access should be provided to the user (e.g., information that the user is in the legal department of a company), etc. Hypervisor 320 may receive the identity information as part of the request for an instance of VM 305, which prompted the execution of guest OS 310. Agent 330 may retrieve the identity information from hypervisor 320 based on information received as a result of probing guest OS 310. The health information, current activity information, and/or the identity information may make up the guest information associated with guest OS 310.

The guest information may be transmitted (block 550). For example, after probing for and determining the guest information, agent 330 may transmit the guest information to firewall agent 340 (or policy engine server 150, as described herein). In one implementation, after initially probing for and determining the guest information, agent 330 may continue to periodically probe guest OS 310 (block 540) (e.g., every 30 seconds) for any updates to the guest information of guest OS 310. Additionally, or alternatively, agent 330 may continue probing guest OS 310 when one or more predefined events occur within guest OS 310 (e.g., memory region where operating system registry is stored is modified). If there are any updates, agent 330 may transmit the updated guest information to firewall agent 340 (or policy engine server 150, as described herein). In another implementation, agent 330 may receive a notification (e.g., from hypervisor 320) that a change-of-interest (a change that is of interest to policy engine server 150 in terms of possibly affecting one or more of the policies stored by policy engine server 150 (e.g., antivirus software is deleted)) occurred for guest OS 310. Agent 330 may probe guest OS 310, in response to the notification, for the updated guest information. Agent 330 may transmit the updated guest information to firewall agent 340 (or policy engine server 150).

Type of access to allow may be determined and access control information may be generated (block 560). For example, in one implementation, firewall agent 340 may receive the guest information from agent 330. Firewall agent 340 may use the health information, current activity information, and/or the identity information in the guest information to determine what type of access is allowed for guest OS 310 (e.g., what resources of destination server 170 that guest OS 310 may access). To do so, firewall agent 340 may compare the health information, current activity information, and/or the identity information to one or more policies/criteria that are specified for one or more resources. Firewall agent 340 may generate access control information for guest OS 310 based on result(s) of the comparisons. In another implementation, policy engine server 150 may receive the guest information from agent 330. Policy engine server 150 may generate access control information based on the guest information and one or more policies/criteria retrieved by policy engine server 150. Policy engine server 150 may transmit the access control information to firewall agent 340. Firewall agent 340 may receive the access control information from policy engine server 150. The access control information may specify what resources, (if any) of destination server 170, guest OS 310 may access. Firewall agent 340 may store the access control information for guest OS 310.

An access request may be received (block 570). For example, a user of client device 110 may use guest OS 310 to attempt to access a resource of destination server 170. The resource may include, for example, a connection to a network (e.g., an Intranet) associated with destination server 170, a web application hosted by destination server 170, a file stored on destination server 170 (which acts as a file server), a storage space to upload a file to destination server 170, etc. Guest OS 310 may generate an access request (or any other network traffic) to access the resource of destination server 170. In one implementation, the access request may include information about the resource of destination server 170 that the user wants to access and information to identify guest OS 310. Guest OS 310 may transmit the access request to access destination server 170. Firewall agent 340 may receive (e.g., by intercepting) the access request. In another implementation, firewall agent 340 may receive at a beginning of a flow of network traffic to determine whether to allow access.

Access may be provided or denied (block 580). For example, firewall agent 340 may determine what guest OS 310 is making the access request. Firewall agent 340 may retrieve the access control information for guest OS 310. Firewall agent 340 may determine, based on the access control information, whether a type of access requested in the access request is allowed for guest OS 310. Firewall agent 340 may provide guest OS 310 access to the resource of destination server 170 when the type of access requested is allowed. When firewall agent 340 provides the access, firewall agent 340 may forward (allow) traffic between guest OS 310 and destination server 170. Firewall agent 340 may deny guest OS 310 access to a resource of destination server 170 when the type of access requested is not allowed by guest OS 310, based on the access control information. When firewall agent 340 denies the access, firewall agent 340 may notify guest OS 310 that access is denied. Firewall agent 340 may also transmit a message, to guest OS 310, to explain why access is denied (e.g., guest OS 310 does not have the correct version of anti-virus software installed, which is required by a policy for accessing destination server 170). In another implementation, firewall agent 340 may also redirect guest OS 310 to connect to a captive portal. The captive portal may allow a user of guest OS 310 to take remedial actions for firewall agent 340 to allow guest OS 310 the type of access requested in the access request.

In other embodiments, environment 100 may provide other services in addition to, or instead of, providing or denying access to guest OS 310. For example, the guest information, from guest OS 310, may include an intrusion detection type. The intrusion detection type may provide contextual information about what types of attacks should be anticipated due to a connection with guest OS 310. In another example, the guest information may include a type of Quality of Service (QoS). The type of QoS may be provided for the traffic associated with guest OS 310.

Figure 6:
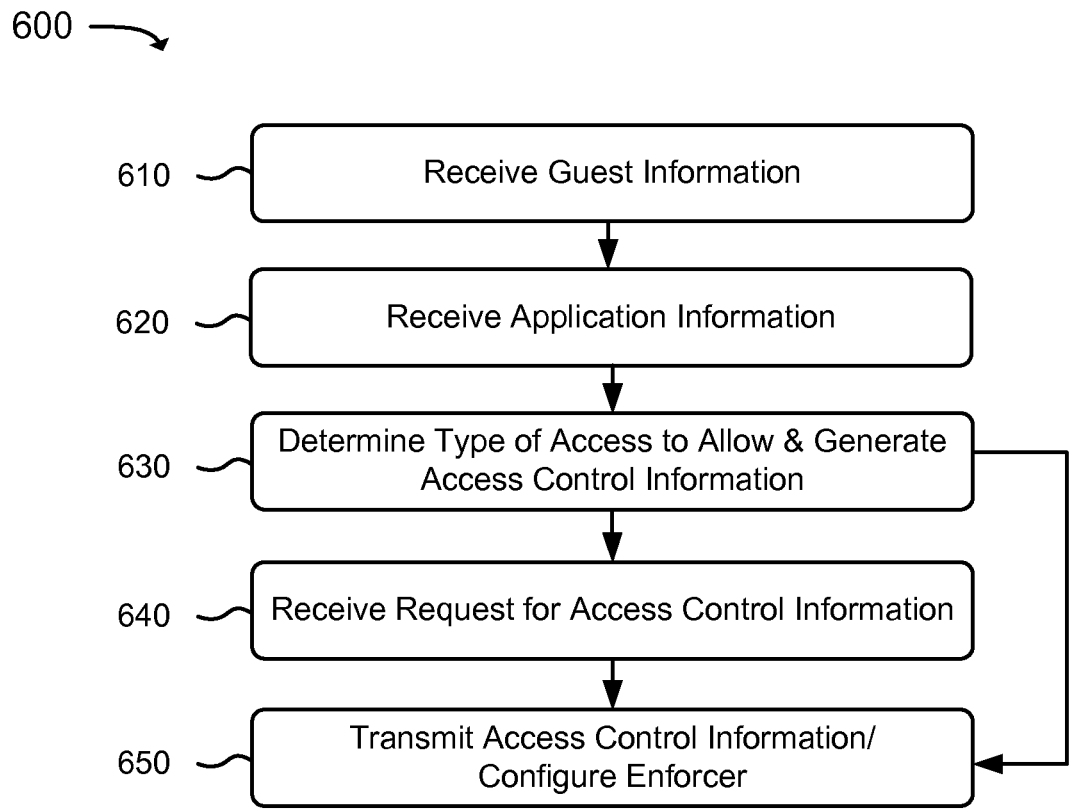
FIG. 6 is a flowchart of an example process for providing access control information.

FIG. 6 is a flowchart of an example process 600 for providing access control information. In one implementation, policy engine server 150 may perform process 600. In another implementation, some or all of process 600 may be performed by a device separate from or in combination with policy engine server 150. Blocks 510-550 of process 500 may precede an occurrence of process 600.

As shown in FIG. 6, process 600 may include receiving guest information (block 610). For example, agent 330 may act as the only agent, in hypervisor 320 of VM server 130, for collecting information from all of guest OSs 310 that may access destination server 170. Agent 330 may probe guest OSs 310 for guest information corresponding to each one of guest OSs 310. Agent 330 may transmit the guest information to policy engine server 150. Policy engine server 150 may receive the guest information from agent 330.

Application information may be received (block 620). For example, agent 430 may act as the only agent, in hypervisor 420 of destination server 170, for collecting information from all of apps 410. In one implementation, agent 430 may probe apps 410 for application information about applications executed on destination server 170. The user of client device 110 may access resources provided by apps 410 via guest OS 310. Agent 430 may transmit the application information to policy engine server 150. Policy engine server 150 may receive the guest information from agent 430.

A type of access to allow may be determined and access control information may be generated (block 630). In one implementation, for example, policy engine server 150 may determine what type of access is allowed (e.g., what resources of destination server 170 that guest OS 310 may access) for each one of guest OSs 310 based on the guest information provided by agent 330. In other words, policy engine server 150 may determine what resources, (if any) of destination server 170, guest OS 310 may access. To do so, policy engine server 150 may conduct a similar process as described above, in reference to block 560, being conducted by firewall agent 340.

In another implementation, policy engine server 150 may determine what type of access is allowed (e.g., what resources of destination server 170 that guest OS 310 may access) for each one of guest OSs 310 based on the guest information provided by agent 330 and the application information provided by agent 430. Policy engine server 150 may store different policies that specify what criteria needs to be met by guest OS 310 and/or a user associated with guest OS 310 for guest OS 310 to access different resources of destination server 170. What policies/criteria apply for guest OS 310 may vary based on the application information. For example, application information of a web-based email application may require that guest OS 310 attempting to access the web-based email application meet criteria for having a firewall enabled. In another example, application information of a web service may require that guest OSs 310 accessing the web service meet policies/criteria, which are stored by policy engine server 150, for having particular anti-virus software installed. Policy engine server 150 may check whether guest OS 310 may access a resource of destination server 170 by determining whether the guest information and/or the application information meet the policies. Policy engine server 150 may generate the access control information for guest OS 310 based on what resources of destination server 170 may be accessed according to the policies.

A request for access control information may be received (block 640). For example, in one implementation, after policy engine server 150 generates the access control information, policy engine server 150 may store the access control information and wait to transmit the access control information until a request is received from enforcer 160. Enforcer 160 may receive/intercept traffic from guest OS 310 when guest OS 310 attempts to access a resource of destination server 170. Enforcer 160 may determine whether enforcer 160 has access control information for guest OS 310. If not, enforcer 160 may generate a request for the access control information for guest OS 310. Enforcer 160 may transmit the request for the access control information to policy engine server 150. Policy engine server 150 may, in response to the request, transmit the access control information to enforcer 160. In another implementation, policy engine server 150 may not wait to receive the request for the access control information before transmitting the access control information to enforcer 160. In yet another implementation, policy engine server 150 may store the guest information and the application information until the request is received from enforcer 160. Policy engine server 150 may determine what type of access to allow and generate the access control information (block 630) only after receiving the request (block 640).

Access control information may be transmitted or an enforcer may be configured (block 650). For example, in one implementation, in response to the request for the access control information, policy engine server 150 may retrieve the access control information associated with guest OS 310 which is associated with the request. Policy engine server 150 may transmit the retrieved access control information to enforcer 160. In another implementation, right after policy engine server 150 generates the access control information for guest OS 310, policy engine server 150 may transmit the access control information to enforcer 160.

Enforcer 160 may receive the access control information from policy engine server 150. Enforcer 160 may determine based on the access control information whether to allow (or deny) guest OS 310 access to a resource of destination server 170. In another implementation, policy engine server 150 may configure enforcer 160 based on the access control information. Policy engine server 150 may configure enforcer 160 without or after receiving the request for the access control information from enforcer 160. To configure enforcer 160, policy engine server 150 may specify when (if ever) enforcer 160 should allow guest OS 310 to access a resource of destination server 160. If enforcer 160 allows access, enforcer 160 may transmit traffic between guest OS 310 and the resource of destination server 170.

In another implementation, enforcer 160 may provide coordinated enforcement. The access control information may specify what resources of destination server 170 guest OS 310 may access at one time. Based on the access control information, enforcer 160 may deny access to one resource as long as guest OS 310 has access to another resource. For example, guest OS 310 may access a resource of destination server 170 that provides legal files. While guest OS 310 is accessing the resource that provides the legal files, enforcer 160 may deny guest OS 310 to access to external network resources (e.g., to prevent the transmission of data to an external resource, to reduce the risk of maliciously changing security profile of agent 330 while accessing destination 170, etc.).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 6, the order of the blocks may be modified in other implementations. In one example, a representation for VM may be transmitted (block 530) after guest OS is probed for guest information (block 540). In another example, an access request may be received (block 570) before a type of access to allow is determined block (560). Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
a first server to:
receive information about a first application and a second application of a second server;
receive identity information of a user,
the user being associated with a client that is connected to a third server, and
the third server executing an operating system for the client;
determine access control information based on the information about the first application and the second application and based on the identity information; and
provide the access control information to an enforcer,
the operating system being provided, by the enforcer, selective access to the first application or the second application based on the access control information.

2. The system of claim 1,
where the first server is further to:
receive, from an agent of the third server, health information regarding the operating system, and
where, when determining the access control information, the first server is to:
determine the access control information based on the information about the first application and the second application, based on the identity information, and based on the health information.

3. The system of claim 1, where, when receiving the identity information, the first server is to:
receive, from an agent of the third server, the identity information of the user.

4. The system of claim 1, where, when receiving the information about the first application and the second application, the first server is to:
receive, from an only agent of a hypervisor of the second server, the information about the first application and the second application.

5. The system of claim 1,
where the operating system includes a first operating system,
where the third server includes the first operating system and a second operating system,
where, when determining the access control information, the first server is to:
determine, for the first operating system, first access control information based on the information about the first application and the second application, based on the identity information, and based on information regarding the first operating system, and
determine, for the second operating system, second access control information based on the information about the first application and the second application, based on the identity information, and based on information regarding the second operating system,
where the second access control information is different from the first access control information, and
where the access control information includes the first access control information and the second access control information.

6. The system of claim 1, where, when providing the access control information, the first server is to:

receive, from the enforcer, a request for the access control information, and provide the access control information to the enforcer based on the request.

7. The system of claim 1, where the access control information indicates that the operating system cannot access external network resources while accessing the first application of the third server.

8. A method comprising:
receiving, by a first server, information about a first application and a second application of a second server;
receiving, by the first server, identity information of a user,
the user being associated with a client that is connected to a third server, and
the third server executing an operating system for the client;
determining, by the first server, access control information based on the information about the first application and the second application and based on the identity information; and
providing, by the first server, the access control information to an enforcer,
the operating system being provided, by the enforcer, selective access to the first application or the second application based on the access control information.

9. The method of claim 8, where providing the access control information to the enforcer comprises:
providing the access control information to the enforcer without receiving a request for the access control information from the enforcer.

10. The method of claim 8, further comprising:
receiving, from an agent of the third server, health information regarding the operating system,
where determining the access control information comprises:
determining the access control information based on the information about the first application and the second application, based on the identity information, and based on the health information.

11. The method of claim 8, where receiving the identity information comprises:
receiving, from an agent of the third server, the identity information.

12. The method of claim 8,
where the operating system includes a first operating system,
where the third server includes the first operating system and a second operating system,
where the access control information includes:
first access control information for the first operating system, and
second access control information for the second operating system, and
where the second access control information is different from the first access control information.

13. The method of claim 8, where a first type of the first application is different from a second type of the second application.

14. The method of claim 8, where the access control information indicates that the operating system cannot access external network resources while accessing the first application of the third server.

15. A non-transitory computer-readable medium storing instructions, the instructions comprising:
one or more instructions that, when executed by at least one processor of a first server, cause the at least one processor to:
receive information about a first application and a second application of a second server;
receive identity information of a user,
the user being associated with a client that is connected to a third server, and
the third server executing an operating system for the client;
generate access control information based on the information about the first application and the second application and based on the identity information; and
provide the access control information to an enforcer,
the operating system being provided, by the enforcer, selective access to the first application or the second application based on the access control information.

16. The non-transitory computer-readable medium of claim 15, where the one or more instructions to generate the access control information comprise:
one or more instructions that, when executed by the at least one processor, cause the at least one processor to:
receive a request for the access control information, and
generate, only after receiving the request, the access control information based on the information about the first application and the second application and based on the identity information.

17. The non-transitory computer-readable medium of claim 15, where the one or more instructions to generate the access control information comprise:
one or more instructions that, when executed by the at least one processor, cause the at least one processor to:
receive, from an agent of the third server, current activity information of the operating system, and
generate the access control information based on the information about the first application and the second application, based on the identity information, and based on the current activity information.

18. The non-transitory computer-readable medium of claim 17, where the current activity information includes information regarding current network connections of the operating system.

19. The non-transitory computer-readable medium of claim 15, where the one or more instructions to generate the access control information comprise:
one or more instructions that, when executed by the at least one processor, cause the at least one processor to:
receive, from an agent of the third server, the identity information.

20. The non-transitory computer-readable medium of claim 15, where the access control information indicates that the operating system cannot access external network resources while accessing the first application of the third server.

* * * * *